(12) United States Patent
Cantadori

(10) Patent No.: US 11,567,001 B2
(45) Date of Patent: Jan. 31, 2023

(54) APPARATUS AND METHOD FOR IDENTIFYING A REFRIGERANT FLUID CONTAINED IN A TANK OR IN MEASURING CELL OF A SYSTEM FOR RECHARGING AN AIR-CONDITIONING PLANT

(71) Applicant: Mahle International GmbH, Stuttgart (DE)

(72) Inventor: Andrea Cantadori, Parma (IT)

(73) Assignee: Mahle International GmbH

( * ) Notice: Subject to any disclaimer, the term of this patent is extended or adjusted under 35 U.S.C. 154(b) by 45 days.

(21) Appl. No.: 16/926,770

(22) Filed: Jul. 12, 2020

(65) Prior Publication Data
US 2021/0010931 A1    Jan. 14, 2021

(30) Foreign Application Priority Data

Jul. 11, 2019 (IT) .................. 102019000011511

(51) Int. Cl.
*G01J 5/02* (2022.01)
*G01N 21/3577* (2014.01)
*G01N 21/84* (2006.01)

(52) U.S. Cl.
CPC ......... *G01N 21/3577* (2013.01); *G01N 21/84* (2013.01); *G01N 2201/0686* (2013.01); *G01N 2223/509* (2013.01); *G01N 2223/637* (2013.01)

(58) Field of Classification Search
CPC ............... G01N 21/3577; G01N 21/84; G01N 2201/0686; G01N 2223/509;
(Continued)

(56) References Cited

U.S. PATENT DOCUMENTS

| 9,194,785 B2 * | 11/2015 | Bentien ............. G01N 15/1459 |
| 2017/0261427 A1 | 9/2017 | Deliwala |
| 2018/0156718 A1 * | 6/2018 | Fleisher .................. G01J 3/42 |

FOREIGN PATENT DOCUMENTS

| CA | 2871892 A1 * | 8/2007 | ........... A61B 5/0836 |
| DE | 102010045643 A1 * | 3/2012 | ........... G01N 21/314 |

(Continued)

OTHER PUBLICATIONS

Nagali et al., "Design of a diode-laser sensor to monitor water vapor in high-pressure combustion gases," Applied Optics, vol. 36, No. 36, pp. 9518-9527. (Year: 1997).*

*Primary Examiner* — Kiho Kim
(74) *Attorney, Agent, or Firm* — Fishman Stewart PLLC

(57) ABSTRACT

The present disclosure describes an apparatus for identifying a refrigerant fluid contained in a tank or in a measuring cell of a system for recharging an air-conditioning plant. The apparatus includes at least one infrared source configured to emit at least radiations with a first emitting intensity at a first wavelength and a second emitting intensity at a second wavelength. A first photodetector is configured to detect a first intensity of infrared radiations at the first wavelength, and a second photodetector is configured to detect a second intensity of infrared radiations at the second wavelength. A processing unit is configured to: calculate a ratio between the first intensity detected by the first photodetector and the second intensity detected by the second photodetector; and according to the Lambert-Beer law, obtain from said ratio a physical magnitude representative of the refrigerant fluid.

10 Claims, 1 Drawing Sheet

(58) Field of Classification Search
CPC ........... G01N 2223/637; G01N 21/314; G01N 21/274; G01N 21/17
See application file for complete search history.

(56) References Cited

FOREIGN PATENT DOCUMENTS

| DE | 102016223424 A1 * | 5/2018 |
|----|---|---|
| GB | 2 324 868 A | 11/1998 |
| WO | WO-2017/132404 | 8/2017 |
| WO | WO-2019/099267 | 5/2019 |

* cited by examiner

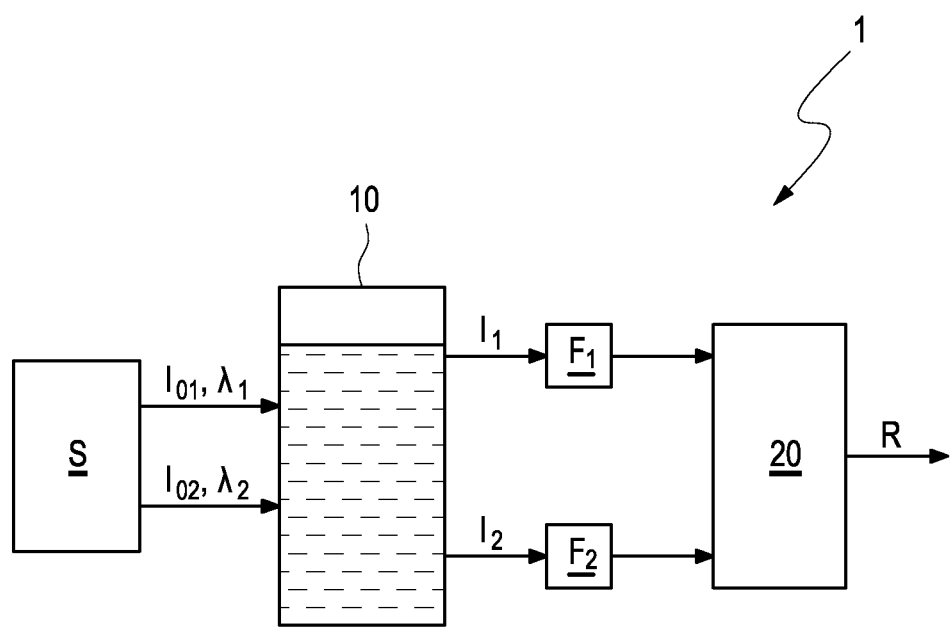

APPARATUS AND METHOD FOR IDENTIFYING A REFRIGERANT FLUID CONTAINED IN A TANK OR IN MEASURING CELL OF A SYSTEM FOR RECHARGING AN AIR-CONDITIONING PLANT

CROSS-REFERENCE TO RELATED APPLICATION

This application claims priority to Italian Patent Application No. IT102019000011511 filed on Jul. 11, 2019, the contents of which are hereby incorporated by reference in its entirety.

TECHNICAL FIELD

The present invention relates to an apparatus and a method for identifying a refrigerant fluid contained in a tank or in measuring cell of a system for recharging an air-conditioning plant.

BACKGROUND

In air-conditioning plants for vehicles, various types of refrigerant fluid may be used. In particular, in vehicle repair workshops, R134a and R1234yf are generally used.

Each vehicle model has a corresponding specific type of refrigerant.

Air-conditioning plants are subject to refrigerant fluid losses and require periodic recharging. To do this, devices for keeping air-conditioning plants in such a state that the recovery, recycling, and recharging of the refrigerant fluid may be performed within the plant itself.

The new refrigerant fluid is contained in a tank which is periodically refilled. Sometimes, it may occur that the same tank is used for different vehicle models, and could therefore contain different refrigerant fluids.

Thus, cross-contaminations may occur, which have a detrimental effect on the performance of the air-conditioning plant.

Systems able to identify the refrigerant fluid contained in a recharging system are already known. These systems, although available in a wide range of designs, are concentration meters or sensors based on NDIR technology, which stands for Non-Dispersive Infrared Technology.

The main components of an NDIR meter are:
an infrared source, or IR source;
a measuring cell;
an optical filter;
an infrared radiation photodetector.

The infrared radiation is emitted by the source and passes through the measuring cell (in which the fluid to be analysed is contained) in the direction of the photodetector. The fluid inside the measuring cell determines the absorption of the infrared radiation at specific wavelengths according to the Lambert-Beer law, that is to say:

$$I = I_0 e^{-kL}$$

where:
$I_0$ is the intensity of the light emitted by the IR source;
k is the coefficient of attenuation, typical of the fluid passed through, dependent on wavelength and pressure
L is the optical path, that is to say the thickness of the fluid passed through
I is the intensity of the radiation received by the photodetector.

The variation of the radiation incident on the photodetector is used to calculate the concentration of the fluid present within the cell.

The photodetector is equipped with an optical filter, which inhibits the passage of the radiation at all wavelengths, with the exception of that which is absorbed by the fluid to be analysed, making it possible to provide sensors with high selectivity.

Meters based on the Lambert-Beer law require knowledge of $I_0$, that is to say the intensity of the light emitted by the IR source. To this end, the measuring cell must be cleaned before a new measurement is started.

In air-conditioning plants, the residues of refrigerant fluid therefore must be removed before performing the measurement, for example by injecting air into the fluid tank by means of a pump.

This step of preliminary cleaning of the tank, however, increases the measurement time.

In addition, the IR source is formed of a refractive material heated to elevated temperatures (above 1000° C.), resulting in deviations in the intensity of light effectively emitted.

These deviations result in errors, the correction of which complicates the measurement system.

In this context, the objective of the present invention is to propose an apparatus and a method for identifying a refrigerant fluid contained in a tank or in a measuring cell of a system for recharging an air-conditioning plant, which apparatus and method overcome the aforementioned disadvantages of the prior art.

SUMMARY

In particular, the object of the present invention is to provide an apparatus for identifying a refrigerant fluid contained in a tank or in a measuring cell of a system for recharging an air-conditioning plant, with which apparatus the problems relating to measurement errors are mitigated or even eliminated.

A further object of the present invention is to provide a method for identifying a refrigerant fluid contained in a tank or in a measuring cell of a system for recharging an air-conditioning plant, which method can be carried out more quickly and is more reliable as compared to the known methods.

The stated technical objective and the specified objects are achieved in essence by an apparatus and by a method for identifying a refrigerant fluid contained in a tank or in a measuring cell of a system for recharging an air-conditioning plant according to the accompanying claims.

BRIEF DESCRIPTION OF THE DRAWINGS

FIG. 1 shows an apparatus for identifying a refrigerant fluid contained in a tank or in a measuring cell of a system for recharging an air-conditioning plant.

DETAILED DESCRIPTION

Further features and advantages of the present invention will become much clearer from the indicative, albeit non-limiting description of a preferred, but not exclusive embodiment of an apparatus and of a method for identifying a refrigerant fluid contained in a tank or that in a measuring cell of a system for recharging an air-conditioning plant, as shown in FIG. 1, which shows a schematic view of an apparatus according to the present invention.

With reference to FIG. 1, numeral 1 denotes an apparatus for identifying a refrigerant fluid contained in a tank or in a measuring cell 10, for example in a system for recharging an air-conditioning plant.

The apparatus 1 comprises at least one infrared source S configured to emit at least radiations with a first emitting intensity $I_{01}$ at a first wavelength $\lambda_1$ and with a second emitting intensity $I_{02}$ at a second wavelength $\lambda_2$.

The infrared source S is arranged in such a way as to send infrared radiations within the refrigerant fluid contained in the tank or measuring cell 10.

Two infrared radiation photodetectors $F_1$, $F_2$ are provided on the opposite side of the refrigerant fluid as compared to the infrared source S.

In particular, a first photodetector $F_1$ is configured to detect a first intensity $I_1$ of infrared radiations at the first wavelength $\lambda_1$.

A second photodetector $F_2$ is instead configured to detect a second intensity $I_2$ of infrared radiations at the second wavelength $\lambda_2$.

The two photodetectors $F_1$, $F_2$ are arranged in such a way as to receive the infrared radiations coming from said refrigerant fluid;

The apparatus 1 also comprises a processing unit 20 which receives two signals at its inlet, each originating from one of the two photodetectors $F_1$, $F_2$.

In particular, the first photodetector $F_1$ provides a first signal, which is representative of the first measured intensity $I_1$, whereas the second photodetector $F_2$ provides a second signal, which is representative of the second measured intensity $I_2$.

The processing unit 20 is configured to calculate the ratio between the first and second signals at the inlet, which is indicative of a ratio R between the first intensity $I_1$ detected by the first photodetector $F_1$ and the second intensity $I_2$ detected by the second photodetector $F_2$.

According to the Lambert-Beer law, the first intensity $I_1$ detected by the first photodetector $F_1$ is equal to:

$$I_1 = I_{01} e^{-k_1 L}$$

Similarly, the second intensity $I_2$ detected by the second photodetector is equal to:

$$I_2 = I_{02} e^{-k_2 L}$$

where $k_1$ and $k_1$ are the coefficients of attenuation of the refrigerant fluid, these being functions of the respective wavelengths $(\lambda_1, \lambda_2)$ and pressure of the refrigerant fluid.

The ratio R between such intensities is:

$$\frac{I_1}{I_2} = \gamma e^{-(k_1 - k_2)L}$$

where $\gamma$ is the ratio $I_{01}/I_{02}$.

On the basis of this ratio R and by applying the Lambert-Beer law, it is therefore possible to form a physical magnitude representative of the refrigerant fluid. In particular, this physical magnitude is the molar concentration of the refrigerant fluid.

The apparatus described and illustrated herein comprises two photodetectors. However, it could comprise further photodetectors.

The measurements shall always be intended as ratios between a pair of intensity values measured by two photodetectors of the apparatus. The physical magnitudes characteristic of the refrigerant fluid are therefore formed by systemizing the equations for the various ratios.

The processing unit 20 may be formed by an electronic module, suitably programmed to perform the functions described, possibly corresponding to various hardware units and/or software routines forming part of the programmed module.

Alternatively or additionally, these functions may be provided by a plurality of distributed electronic modules.

The processing unit 20 may also comprise one or more processors for executing the instructions contained in memory modules.

The features of the apparatus and of the method for identifying a refrigerant fluid contained in a tank or in a measuring cell of a system for recharging an air-conditioning plant according to the present invention have been clarified by the description provided, as have the advantages thereof.

Thanks to the calculation of the ratio between intensities, the problem relating to deviations in intensity of the IR source caused by thermal fluctuations of the heating element from which it is formed has been solved. Thus, it is not necessary to perform an initial cleaning of the measuring cell or to make measurement corrections.

The invention claimed is:

1. An apparatus for identifying a refrigerant fluid contained in a tank or in a measuring cell of a system for recharging an air-conditioning plant, comprising:
    at least one infrared source configured to emit at least radiations with a first emitting intensity at a first wavelength and a second emitting intensity at a second wavelength, the at least one infrared source structured and arranged to send infrared radiations within the refrigerant fluid contained in the tank or the measuring cell;
    a first photodetector configured to detect a first intensity of infrared radiations at the first wavelength;
    a second photodetector configured to detect a second intensity of infrared radiations at the second wavelength, wherein said second photodetector is separate from said first photodetector, and wherein said first photodetector and said second photodetector are arranged to receive the infrared radiations coming from said refrigerant fluid;
    a processing unit configured to:
        calculate a ratio between the first intensity detected by the first photodetector and the second intensity detected by the second photodetector; and
        according to the Lambert-Beer law, obtain from said ratio a physical magnitude representative of the refrigerant fluid;
    wherein said first photodetector and said second photodetector are arranged to receive the infrared radiations coming from said refrigerant fluid contained within a common interior of the tank or the measuring cell.

2. The apparatus according to claim 1, wherein said first photodetector and said second photodetector each include a corresponding optical filter configured to allow the passage of the infrared radiation having respectively the first wavelength or the second wavelength.

3. The apparatus according to claim 1, wherein the processing unit receives a first signal from the first photodetector that is representative of the first intensity and a second signal from the second photodetector that is representative of the second intensity, and calculates a ratio between the first signal and the second signal that is indicative of the ratio between the first intensity and the second intensity.

4. The apparatus according to claim 1, wherein the physical magnitude obtained from said ratio is a molar concentration of said refrigerant fluid.

5. A method for identifying a refrigerant fluid contained in a tank or in a measuring cell of a system for recharging an air-conditioning plant, comprising the steps of:
   emitting in a direction of the refrigerant fluid infrared radiations with a first emitting intensity at a first wavelength and a second emitting intensity at a second wavelength;
   detecting a first intensity of infrared radiations at the first wavelength by a first photodetector after the infrared radiations have passed through the refrigerant fluid;
   detecting a second intensity of infrared radiations at the second wavelength by a second photodetector after the infrared radiations have passed through the refrigerant fluid, wherein said second photodetector is structured and arranged separately from said first photodetector;
   calculating a ratio between the first intensity detected upon the exit of the refrigerant fluid and the second intensity detected upon the exit of the refrigerant fluid; and
   according to the Lambert-Beer law, obtaining from said ratio a physical magnitude representative of the refrigerant fluid;
   wherein said first photodetector and said second photodetector receive said infrared radiations coming from the refrigerant fluid contained within a common interior of the tank or the measuring cell.

6. The method according to claim 5, wherein the first photodetector and the second photodetector each include a corresponding optical filter configured to allow the passage of the infrared radiation having respectively the first wavelength or the second wavelength.

7. The method according to claim 5, further comprising receiving, via a processor, a first signal from the first photodetector that is representative of the first intensity and a second signal from the second photodetector that is representative of the second intensity, and calculating a ratio between the first signal and the second signal that is indicative of the ratio between the first intensity and the second intensity.

8. A non-transitory computer readable medium tangibly embodying computer-executable instructions that when executed by a processor cause the processor to perform operations comprising:
   emitting in a direction of a refrigerant fluid contained in a tank or a measuring cell infrared radiations with a first emitting intensity at a first wavelength and a second emitting intensity at a second wavelength;
   detecting a first intensity of infrared radiations at the first wavelength by a first photodetector after the infrared radiations have passed through the refrigerant fluid in the tank or the measuring cell;
   detecting a second intensity of infrared radiations at the second wavelength by a second photodetector after the infrared radiations have passed through the refrigerant fluid in the tank or the measuring cell, said second photodetector structured separately from said first photodetector;
   calculating a ratio between the first intensity detected upon the exit of the refrigerant fluid and the second intensity detected upon the exit of the refrigerant fluid; and
   according to the Lambert-Beer law, obtaining from said ratio a physical magnitude representative of the refrigerant fluid;
   wherein said first photodetector and said second photodetector are arranged to receive the infrared radiations coming from said refrigerant fluid contained within a common interior of the tank or the measuring cell.

9. The non-transitory computer readable medium according to claim 8, wherein the first photodetector and the second photodetector each include a corresponding optical filter configured to allow the passage of the infrared radiation having respectively the first wavelength or the second wavelength.

10. The non-transitory computer readable medium according claim 8, wherein the processor receives a first signal from the first photodetector that is representative of the first intensity and a second signal from the second photodetector that is representative of the second intensity, and calculates a ratio between the first signal and the second signal that is indicative of the ratio between the first intensity and the second intensity.

\* \* \* \* \*